US010387863B2

(12) United States Patent
Alzamendi et al.

(10) Patent No.: US 10,387,863 B2
(45) Date of Patent: Aug. 20, 2019

(54) METHOD AND SYSTEM FOR USAGE OF PAYMENT CARDS AT TRAVEL TERMINALS

(71) Applicant: MasterCard International Incorporated, Purchase, NY (US)

(72) Inventors: Hernan Alzamendi, Sunrise, FL (US); Miguel Angel Liriano, Homestead, FL (US); Arleen Aponte Figueroa, Miramar, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 555 days.

(21) Appl. No.: 14/967,903

(22) Filed: Dec. 14, 2015

(65) Prior Publication Data

US 2017/0169417 A1 Jun. 15, 2017

(51) Int. Cl.
*G06Q 20/22* (2012.01)
*G06Q 20/38* (2012.01)
(Continued)

(52) U.S. Cl.
CPC .......... *G06Q 20/22* (2013.01); *G06Q 10/025* (2013.01); *G06Q 20/354* (2013.01);
(Continued)

(58) Field of Classification Search
CPC ............. G06Q 20/409; G06Q 20/4093; G06Q 20/4097; G06Q 20/22; G06Q 20/405; G06Q 20/4016
(Continued)

(56) References Cited

U.S. PATENT DOCUMENTS

2009/0112747 A1* 4/2009 Mullen .................. G06Q 20/04
705/35
2010/0023455 A1* 1/2010 Dispensa ............... G06Q 10/02
705/44
(Continued)

OTHER PUBLICATIONS

Button Mark, Cross-border fraud and the case for an "Interfraud", Apr. 19, 2011, Center for Counter Fraud Studies, University of Portsmouth (Year: 2011).*

(Continued)

*Primary Examiner* — Eric T Wong
*Assistant Examiner* — Kevin T Poe
(74) *Attorney, Agent, or Firm* — Buchanan Ingersoll & Rooney PC

(57) ABSTRACT

A method for transmitting travel notifications to issuing entities includes: receiving travel data associated with travel plans of a consumer, the travel data including a departure date and destination location; reading at least one set of payment card details, each set of payment card details being encoded in a physical payment card or electronically transmitted by a computing device, and where the set of payment card details includes an account number associated with a transaction account; generating a data message for each set of payment card details, the data message including the travel data and the respective set of payment card details; and electronically transmitting a data signal for each generated data message, the data signal being electronically transmitted to a financial institution associated with the transaction account associated with the account number included in the set of payment card details included in the respective data message.

16 Claims, 8 Drawing Sheets

(51) Int. Cl.
*G06Q 10/02* (2012.01)
*G06Q 20/34* (2012.01)
*G06Q 20/40* (2012.01)

(52) U.S. Cl.
CPC ......... *G06Q 20/382* (2013.01); *G06Q 20/405* (2013.01); *G06Q 20/4016* (2013.01)

(58) Field of Classification Search
USPC .......................................................... 705/44
See application file for complete search history.

(56) References Cited

U.S. PATENT DOCUMENTS

| | | |
|---|---|---|
| 2013/0006822 A1 | 1/2013 | Depetro |
| 2013/0006858 A1* | 1/2013 | DePetro ............. G06Q 20/3224 705/44 |
| 2014/0067649 A1* | 3/2014 | Kannan .................. H04L 67/20 705/38 |
| 2014/0337062 A1 | 11/2014 | Howe |
| 2016/0110716 A1* | 4/2016 | Sharifi Mehr ..... G06Q 20/3567 705/75 |
| 2016/0321634 A1* | 11/2016 | George ................ G06Q 20/202 |

OTHER PUBLICATIONS

Van Eijk R.J., Ebben P.W.G., Bargh, M.S., Implementation of a Scheduler Agent System for Traveling Users, researchgate.net (Year: 2011).*

Van Vlasselaer Veronique, Bravo Cristian, Caelen, Eliassi-Rad Tina, Akoglu Leman, Snoeck Monique, Baesens Bart, A Novel Approach for Automated Credit Card Transaction Fraud Detection using Network-Based Extensions, Decision Support Systems (Year: 2015).*

International Search Report and Written Opinion issued by the International Search Authority dated Feb. 23, 2017 in corresponding PCT Application No. PCT/US2016/062709 (12 pages).

* cited by examiner

METHOD AND SYSTEM FOR USAGE OF PAYMENT CARDS AT TRAVEL TERMINALS

FIELD

The present disclosure relates to the transmission of travel notifications to entities, specifically the transmission of notifications of future travel to a financial institution such that use of associated payment instruments is not limited due to traveling.

BACKGROUND

Payment cards and other similar payment instruments are often used by consumers out of convenience among a myriad of additional benefits. In an effort to prevent fraud and assist consumers in their purchases, financial institutions often utilize a variety of rules and algorithms designed to detect fraud when a payment transaction is conducted. In many instances, these rules can include the decline of any payment transaction that is initiated in a geographic location (e.g., a country) different than one associated with a transaction account. Such rules can be beneficial for consumers, but may become cumbersome when the consumer travels outside of their home geographic location.

In traditional systems, a consumer may be required to call their financial institution, speak with an employee of the institution, and inform the employee of their travel plans, to ensure that they can use their payment card in a new geographic area when they travel. However, such a process may require a significant time commitment by the consumer, as well as requiring significant resources by the financial institution, which must employ personnel to attend to such calls. In addition, the consumer must be mindful and remember to call the financial institution prior to traveling, as calling from the new geographic area after travel has begun may be exceedingly difficult due to connectivity problems, time differences, etc.

Some systems have been developed to enable a financial institution to be notified of a consumer's travels based on the geographic location of a mobile device, such as a cellular phone, associated with the consumer. However, such systems rely on the consumer having first registered a mobile device, being in possession of that mobile device during travel, having that mobile device being turned on, and that mobile device having an adequate connection to a partner mobile network operator. As a result, there are many instances where such a system may fail to properly notify a financial institution.

Thus, there is a need for a technical solution whereby a financial institution can be notified of a consumer's travel itinerary prior to travel with minimal consumer interaction, and without the need for pre-registration of a transaction account for such a service. By utilizing a technical system that limits the instructions received by a consumer, payment transactions may be processed with fewer difficulties faced by both consumers and financial institutions, resulting in additional benefits for all entities involved in the processing of transactions.

SUMMARY

The present disclosure provides a description of systems and methods for transmitting travel notifications to issuing entities.

A method for transmitting travel notifications to issuing entities includes: receiving, by a receiving device of a processing server, travel data associated with travel plans of a consumer, wherein the travel data includes at least a departure date and a destination location; reading, by a reading device of the processing server, at least one set of payment card details, wherein each set of payment card details is (i) encoded in a physical payment card or (ii) superimposed on a data signal electronically transmitted by a computing device, and where the set of payment card details include at least an account number associated with a transaction account; generating, by a generation module of the processing server, a data message for each set of payment card details, wherein the data message include at least the travel data and the respective set of payment card details; and electronically transmitting, by a transmitting device of the processing server, a data signal for each generated data message, wherein the data signal is superimposed with the respective data message and is electronically transmitted to a financial institution associated with the transaction account associated with the account number included in the set of payment card details included in the respective data message.

Another method for transmitting travel notifications to issuing institutions includes: storing, in a secured data storage of a mobile computing device, one or more sets of payment card details, wherein each set of payment card details is a structured data set associated with a transaction account and includes at least an account number; receiving, by a receiving device of the mobile computing device, travel data associated with travel plans of a user, wherein the travel data includes at least a departure date and a destination location; receiving, by an input device of the mobile computing device, a user selection, wherein the user selection indicates at least one of the one or more stored sets of payment card details; generating, by a generation module of the mobile computing device, a data message, wherein the data message includes at least the travel data and account number included in each of the indicated at least one set of payment card details; and electronically transmitting, by a transmitting device of the mobile computing device, a data signal, wherein the data signal is superimposed with the generated data message.

A system for transmitting travel notifications to issuing entities includes: a receiving device of a processing server configured to receive travel data associated with travel plans of a consumer, wherein the travel data includes at least a departure date and a destination location; a reading device of the processing server configured to read at least one set of payment card details, wherein each set of payment card details is (i) encoded in a physical payment card or (ii) superimposed on a data signal electronically transmitted by a computing device, and where the set of payment card details include at least an account number associated with a transaction account; a generation module of the processing server configured to generate a data message for each set of payment card details, wherein the data message include at least the travel data and the respective set of payment card details; and a transmitting device of the processing server configured to electronically transmit a data signal for each generated data message, wherein the data signal is superimposed with the respective data message and is electronically transmitted to a financial institution associated with the transaction account associated with the account number included in the set of payment card details included in the respective data message.

Another system for transmitting travel notifications to issuing institutions includes: a secured data storage of a mobile computing device configured to store one or more sets of payment card details, wherein each set of payment card details is a structured data set associated with a transaction account and includes at least an account number; a receiving device of the mobile computing device configured to receive travel data associated with travel plans of a user, wherein the travel data includes at least a departure date and a destination location; an input device of the mobile computing device configured to receive a user selection, wherein the user selection indicates at least one of the one or more stored sets of payment card details; a generation module of the mobile computing device configured to generate a data message, wherein the data message includes at least the travel data and account number included in each of the indicated at least one set of payment card details; and a transmitting device of the mobile computing device configured to electronically transmit a data signal, wherein the data signal is superimposed with the generated data message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1A:
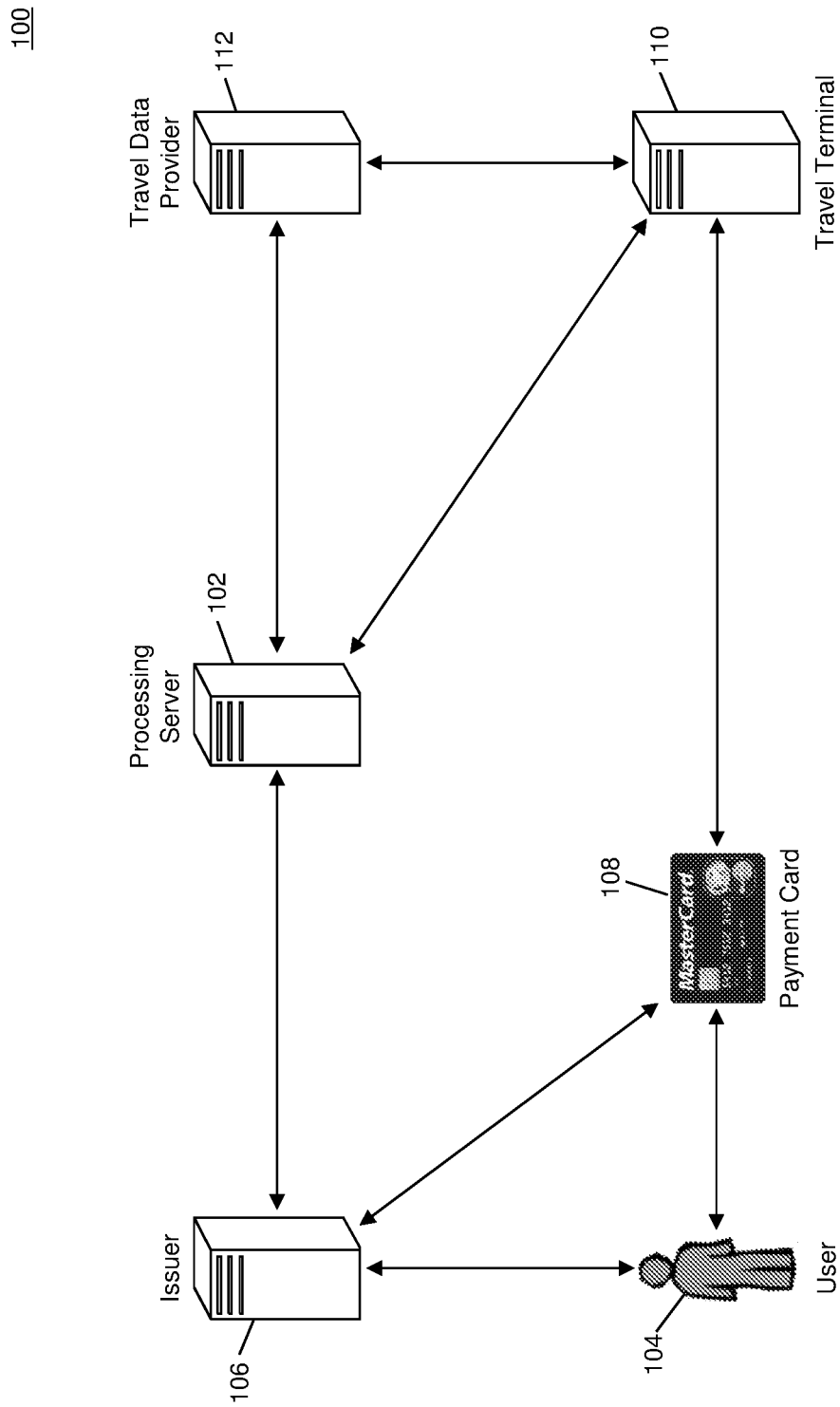
FIGS. 1A and 1B are block diagrams illustrating high level system architectures for transmitting travel notifications to issuing entities in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Transmitting of Travel Notifications to Issuing Entities

FIG. 1A illustrates a system 100 for the transmitting of travel notifications to an issuing entity that utilizes a terminal used for check-in prior to travel.

The system 100 may include a processing server 102. The processing server 102, discussed in more detail below, may be configured to transmit travel notifications to issuing financial institutions, such as the issuer 106. The travel notifications may inform the issuer 106, which may be any suitable type of issuing financial institution, such as an issuing bank, of travel by a customer associated with the issuer 106, such that the issuer 106 can perform any necessary actions for the ongoing of payment services provided to the customer. For instance, the issuer 106 may update data associated with the customer such that payment transactions initiated from a geographic area to which the customer is traveling are not denied due to the location.

The system 100 may interact with a user 104. The user 104 may be a customer of the issuer 106 to whom the issuer 106 has issued a payment card 108 or other suitable payment instrument. The payment card 108 may be associated with a payment account held or otherwise managed by the issuer 106 to which the user 104 corresponds. The payment card 108 may be a physical payment card or may be issued to the user 104 in a suitable, alternative format. For example, the payment card 108 may be issued in electronic form, perhaps as a tokenized version of the payment card 108, to a mobile device associated with the user 104 and stored therein for use in conducting payment transactions, such as in conjunction with a digital wallet application program.

As part of the user's travel, the user 104 may utilize a travel terminal 110 to check-in for their travel or to otherwise manage their travel itinerary. The travel terminal 110 may be any type of computing device configured to perform the functions as discussed herein. For example, the travel terminal 110 may be a self-service kiosk used by the user 104, may be a computer used by an employee of a travel provider, etc. As part of the check-in or management of the user's travel itinerary, the user 104 may convey payment card details for their transaction account to the travel terminal 110 using the payment card 108. The conveyance of payment card details may be based on the payment card 108 and may use any suitable method for the conveyance of payment card details. For example, the payment card 108 may be a physical payment card where payment card details encoded or stored therein may be read from a magnetic stripe comprising the payment card 108 or read from the payment card 108 using near field communication, radio frequency, Bluetooth, or other suitable communication method. In another example, the payment card 108 may be stored in a mobile device, which may be configured to electronically transmit a data signal to the travel terminal 110 via a suitable communication method that is superimposed with payment card details stored therein. Payment card details conveyed to the travel terminal 110 may include at least a transaction account number associated with the transaction account to which the payment card 108 is associated.

The travel terminal 110 may then electronically transmit the payment card details to the processing server 102. The payment card details may be transmitted via superimposition in a data signal that is electronically transmitted to the processing server 102 via a suitable communication network, such as a local area network, wireless area network, radio frequency network, or the Internet. In some embodiments, the travel terminal 110 and the processing server 102 may be a single computing device, where the single computing device may be configured to perform the functions of both the processing server 102 and travel terminal 110 as discussed herein.

In some embodiments, the travel terminal 110 may also electronically transmit travel data to the processing server 102 associated with the user 104 to whom the payment card details correspond. In such an instance, the travel terminal 110 may obtain travel data associated with the user 104 prior to the transmission of the payment card details to the processing server 102. In one embodiment, the user 104 may input the travel data into the travel terminal 110 using one or more suitable input devices, such as a keyboard, mouse, touch screen, microphone, camera, etc. For instance, in one example, the user 104 may input their travel data into the travel terminal 110 using a mobile device, such as by transmission via near field communication or a machine-readable code that is encoded with the travel data and read by an optical reader of the travel terminal 110. In other embodiments, the travel terminal 110 may receive travel data from a travel data provider 112.

The travel data provider 112 may be configured to store travel data associated with users 104 and convey the travel data to a computing device upon request. For instance, the travel terminal 110 may electronically transmit a data signal to the travel data provider 112 that is superimposed with a travel data request. The travel data request may include at least one or more pieces of identifying information suitable for use by the travel data provider. For example, the travel data request may include the payment card details conveyed from the payment card 108 or data included therein, such as the transaction account number, or data input by the user, such as an identification number, confirmation number, name, e-mail address, phone number, etc. The travel data provider 112 may identify travel data using the identifying information and may electronically transmit a data signal superimposed with the identified travel data back to the travel terminal 110. The travel terminal 110 may then include the travel data in the data signal electronically transmitted to the processing server 102 that includes the payment card details. In some embodiments, the processing server 102 may be configured to obtain the travel data from the travel data provider 112 using the same or similar methods, such as by submitting a travel data request that includes the payment card details received from the travel terminal 110.

The travel data may include data associated with the travel plans of the user 104 that is suitable for use by the issuer 106 in providing payment services to the user 104. For example, the travel data may include at least a geographic area to which the user 104 is traveling, and may also include an arrival date and/or a return date. The issuer 106 may then flag the transaction account associated with the payment card 108 such that payment transactions originating from the new geographic area after the arrival date may not be denied due to the change in geographic area. In instances where a return date is available, the issuer 106 may revert the modification to the transaction account at the return date.

In some embodiments, the processing server 102 may be configured to electronically transmit travel notifications to a plurality of different issuers 106. For instance, the user 104 may convey payment card details for more than one payment card 108 to the travel terminal 110, such as by having the travel terminal 110 read multiple payment cards 108. The travel terminal 110 may electronically transmit each set of payment card details to the processing server 102. The processing server 102 may thus electronically transmit a travel notification to the issuer 106 associated with each of the sets of payment card details. The processing server 102 may be configured to identify an issuer 106 for the transmission of a travel notification based on the associated payment card details. For instance, the processing server 102 may identify an issuer 106 based on a bank identification number included in a transaction account number included in a received set of payment card details.

In some embodiments, the travel notification may be electronically transmitted by the processing server 102 to the issuer 106 using the Internet, a cellular communication network, or other similar communication network. In other embodiments, the processing server 102 may be configured to electronically transmit travel notifications to issuers 106 via a payment network using the payment rails. The payment rails may be specialized infrastructure associated with a payment network that are used to convey transaction messages, which are specially formatted data messages that are formatted based on one or more standards governing the exchange of financial transaction messages, such as the International Organization for Standardization's ISO 8583 standard. Payment rails, payment networks, and transaction messages are discussed in more detail below with respect to the process 600 illustrated in FIG. 6. In such embodiments, the processing server 102 may generate a transaction message that includes a data element configured to store the travel data, and may electronically transmit the transaction message to the issuer 106 via the payment rails.

The methods and systems discussed herein may enable the user 104 to notify one or more issuers 106 of their travel plans without having to contact the issuer 106 directly and using a faster and more efficient process. In addition, the use of travel terminals 110 to convey payment card details for providing to the issuer 106 may enable the user 104 to notify the issuer 106 without having to manually provide travel data, as well as without having to perform any additional processes than those already performed related to travel. For instance, the user 104 may check-in for a flight at a travel terminal 110, which may initiate the transmission of a travel notification to the issuer 106 associated with the flight, which may negate the need for the user 104 to perform any functions beyond their usual check-in process, while still notifying the issuer 106 of their travel plans.

Figure 1B:
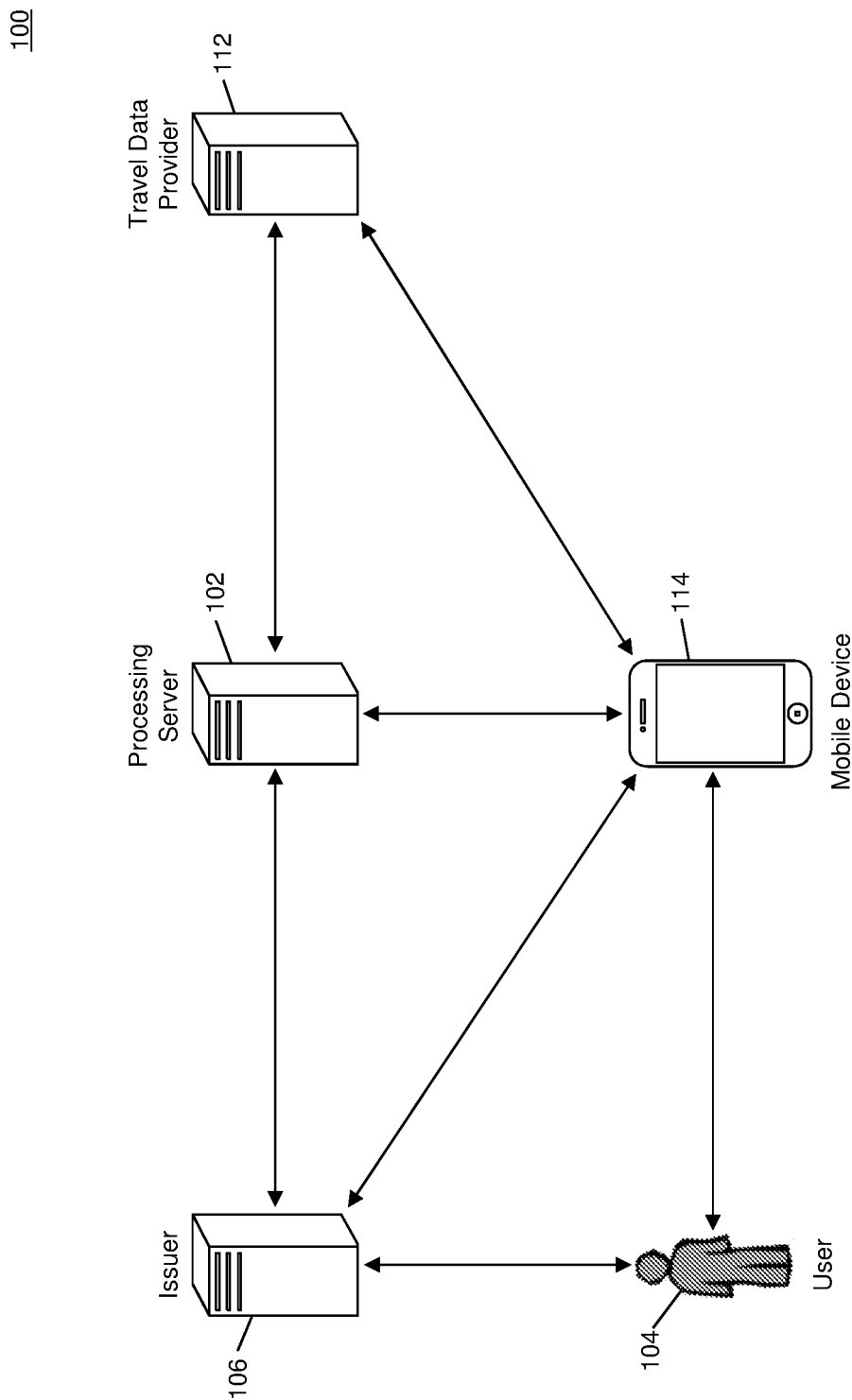

FIG. 1B illustrates an alternative system 100 whereby the user 104 may electronically transmit a travel notification to the issuer 106 via a mobile device 114 in place of the travel terminal 110.

In the system 100, the user may have a mobile device 114. The mobile device 114 may be any type of computing device suitable for performing the functions discussed herein, including the secured storage of payment card details associated with one or more transaction accounts, such as a cellular phone, smart phone, tablet computer, notebook computer, laptop computer, smart watch, wearable computing device, implantable computing device, etc. The mobile device 114 may include a digital wallet application program or other suitable application program for use in the provisioning of payment card details to the mobile device 114 for storage in a secure storage in the mobile device 114, such as a Secure Element.

The user 104 may use an application program on the mobile device 114 to initiate the transmission of a travel notification to the issuer 106. As part of the initiation, the user 104 may input, via an input device of the mobile device 114, the selection of one or more sets of payment credentials for which the user 104 wants to provide a travel notification. The mobile device 114 may receive the input and may generate a data message for each set of payment credentials for which a travel notification is requested. Each data message may also include travel data. The travel data may be input in the mobile device 114 by the user 104, or may be acquired by the mobile device 114 from the travel data provider 112. For instance, the mobile device 114 may, as discussed above, electronically transmit a travel data request to the travel data provider 112 that includes payment card details or identifying information. The travel data provider 112 may identify the travel data and electronically transmit the travel data back to the mobile device 114 using a suitable communication network, such as a cellular communication network, the Internet, etc.

The mobile device 114 may electronically transmit a data signal superimposed with a travel notification, including the payment credentials and travel data, to each issuer 106 associated with an indicated set of payment credentials. In some instances, the data signal may be electronically transmitted to the issuer 106 using a communication network such as a cellular communication network, the Internet, or other similar communication network. In other instances, the mobile device 114 may be configured to generate a transaction message that includes the travel notification that is electronically transmitted to the issuers 106 via the payment rails. In some embodiments, the mobile device 114 may electronically transmit the payment credentials and travel data to the processing server 102, which may forward a travel notification to the issuer 106.

The use of a mobile device 114 configured to store payment credentials for the providing of travel notifications may enable the user 104 to provide travel notifications to issuers 106 more quickly and efficiently than in traditional systems. In addition, the use of a mobile device 114 may enable the retrieval of accurate travel data from a travel data provider 112 for conveyance to the issuer 106. Furthermore, the mobile device 114 may be configured to automatically initiate the transmission of a travel notification upon check-in or other action performed as associated with travel using the mobile device 114, such as in operation similar to the travel terminal 110. In such instances, the mobile device 114 may operate as a travel terminal 110 and perform the associated functions discussed herein, in addition to the secure storage of payment credentials such that payment credentials need not be read from a payment card 108 prior to the transmission of the travel notification.

Processing Server

Figure 2:
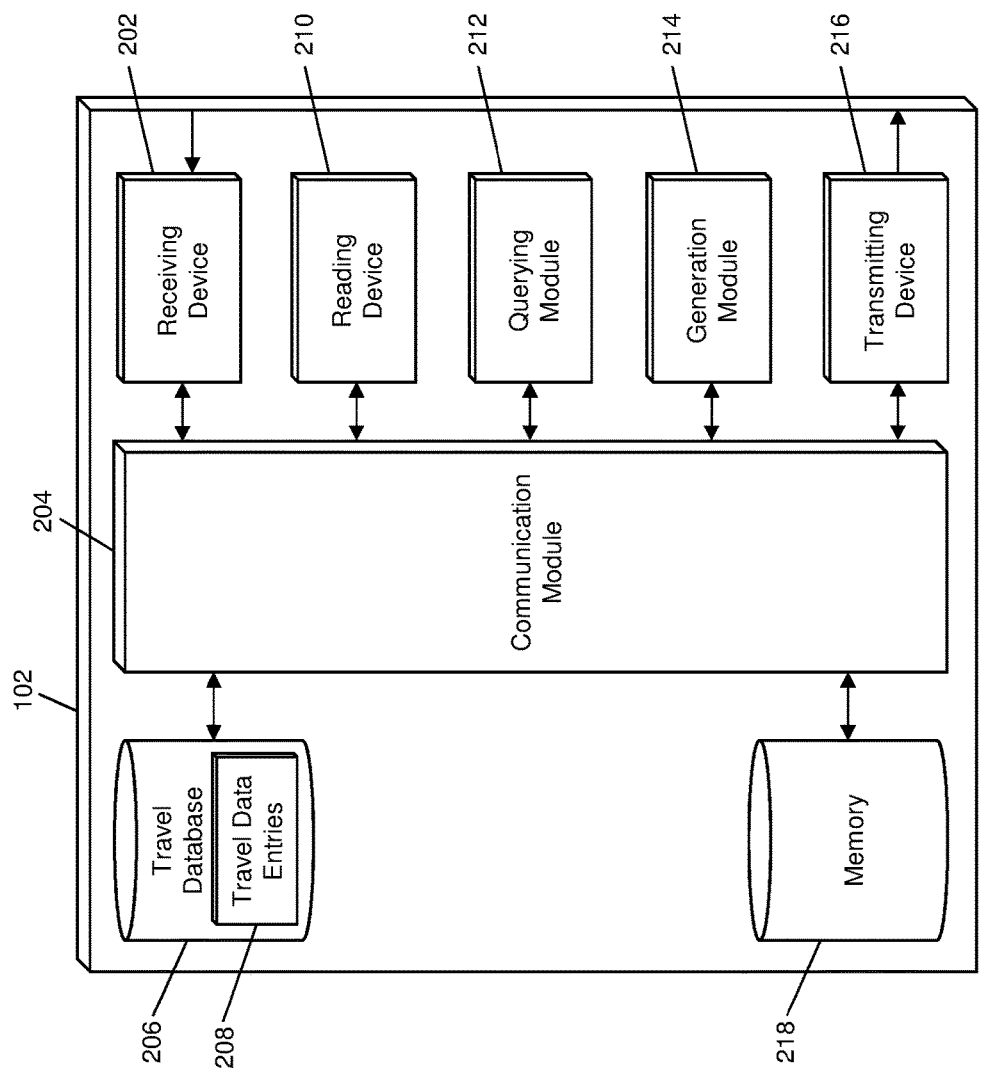
FIG. 2 is a block diagram illustrating the processing server of FIG. 1A for the transmitting of travel notifications to issuing entities in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks for the transmission of transaction messages that include sensitive financial data and information. In some instances, the receiving device 202 may also be configured to receive data from payment cards 108, processing servers 102, travel data providers 112, mobile devices 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by travel data providers 112 that are superimposed with travel data. Travel data may be received by the receiving device 202 from the travel data provider 112 and may include geographic areas and/or travel dates associated with travel involving one or more users 104. In some instances, travel data may be received by the receiving device 202 following the submission of a travel data request to the travel data provider 112. The receiving device 202 may also be configured to receive data signals electronically transmitted by processing servers 102, such as data signals superimposed with requests for payment credentials and/or travel data. The receiving device 202 may also receive data signals electronically transmitted by mobile devices 114, such as may be superimposed with payment card details and/or travel data.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 212, generation module 214, etc. As used herein, the term "module" may be software or hardware particularly programmed to receive an input, perform one or more processes using the input, and provide an output. The input, output, and processes performed by various modules will be apparent to one skilled in the art based upon the present disclosure.

In some embodiments, the processing server 102 may include a travel database 206. The travel database 206 may be configured to store a plurality of travel data entries 208 using a suitable data storage format and schema. The travel database 206 may be a relational database that utilizes structured query language for the storage, identification, modifying, updating, accessing, etc. of structured data sets stored therein. Each travel data entry 208 may be a structured data set configured to store travel data associated with a travel itinerary of a user 104. Each travel data entry 208 may include at least travel data and one or more pieces of identifying information. The travel data may include at least a geographic area and may also include a departure time and/or date, arrival time and/or date, return time and/or date, departure code, return code, travel provider identifier, flight number, travel number, etc. The one or more pieces of identifying information may include a transaction account number, confirmation number, identification number, name, e-mail address, phone number, device identifier, username, etc.

The processing server 102 may also include a reading device 210. The reading device 210 may be configured to read data from a payment card 108 or mobile device 114 that is encoded with or otherwise configured to convey payment credentials. For example, the reading device 210 may be configured to read payment credentials encoded in a magnetic stripe of a payment card 108, read payment credentials encoded in a machine-readable code displayed on a mobile device 114, read payment credentials electronically transmitted from a payment card 108 or mobile device 114 using near field communication, etc. The reading device 210 may also be configured to read travel data, such as conveyed via a travel instrument (e.g., a ticket, passport, etc.) or a mobile device 114 using suitable methods. In some embodiments, the processing server 102 may also include an input device, which may be used in conjunction with the receiving device 202 and/or reading device 210 for receiving/reading input data, such as a keyboard, mouse, touch screen, click wheel, scroll wheel, microphone, camera, optical reader, etc.

In some embodiments, the processing server 102 may include a querying module 212. The querying module 212 may be configured to execute queries on databases to identify information. The querying module 212 may receive one or more data values or query strings, and may execute a query string based thereon on an indicated database, such as the travel database 206, to identify information stored therein. The querying module 212 may then output the identified information to an appropriate engine or module of the processing server 102 as necessary. The querying module 212 may, for example, execute a query on the travel database 206 to identify a travel data entry 208 corresponding to a received set of payment credentials using information included therein, which may then be conveyed to another engine or module of the processing server 102, such as a generation module 214.

The generation module 214 may be configured to generate data messages. The generation module 214 may receive data as input, such as travel data and a set of payment credentials, and may generate a data message including the input data. In some instances, the generation module 214 may be configured to generate transaction messages, which may be data messages that are specially formatted based on one or more standards, such as the ISO 8583 standard. The generated data or transaction message may include the travel data and payment credentials, and may then be output to another engine or module of the processing server 102, such as to a transmitting device 216.

The transmitting device 216 may be configured to transmit data over one or more networks via one or more network protocols. In some embodiments, the transmitting device 216 may be configured to transmit data over the payment rails, such as using specially configured infrastructure associated with payment networks for the transmission of transaction messages that include sensitive financial data and information, such as identified payment credentials. In some instances, the transmitting device 216 may be configured to transmit data to issuers 106, travel terminals 110, travel data providers 112, mobile devices 114, and other entities via alternative networks, such as the Internet. In some embodiments, the transmitting device 216 may be comprised of multiple devices, such as different transmitting devices for transmitting data over different networks, such as a first transmitting device for transmitting data over the payment rails and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to issuers 106 that are superimposed with data messages generated by the generation module 214 that include associated payment credentials and travel data. In instances where the data message may be a transaction message, the transmitting device 216 may be configured to electronically transmit the transaction message to an issuer 106 using the payment rails. The transmitting device 216 may also be configured to electronically transmit data signals to travel data providers 112 that are superimposed with travel data requests. Travel data requests may include one or more pieces of identifying information, such as received by the receiving device 202 or read by the reading device 210. The receiving device 202 may be configured to receive data signals superimposed with travel data in response to the transmitted travel data request, which may be used in the generation of the data messages electronically transmitted by the transmitting device 216.

The processing server 102 may also include a memory 218. The memory 218 may be configured to store data for use by the processing server 102 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Mobile Device

Figure 3:
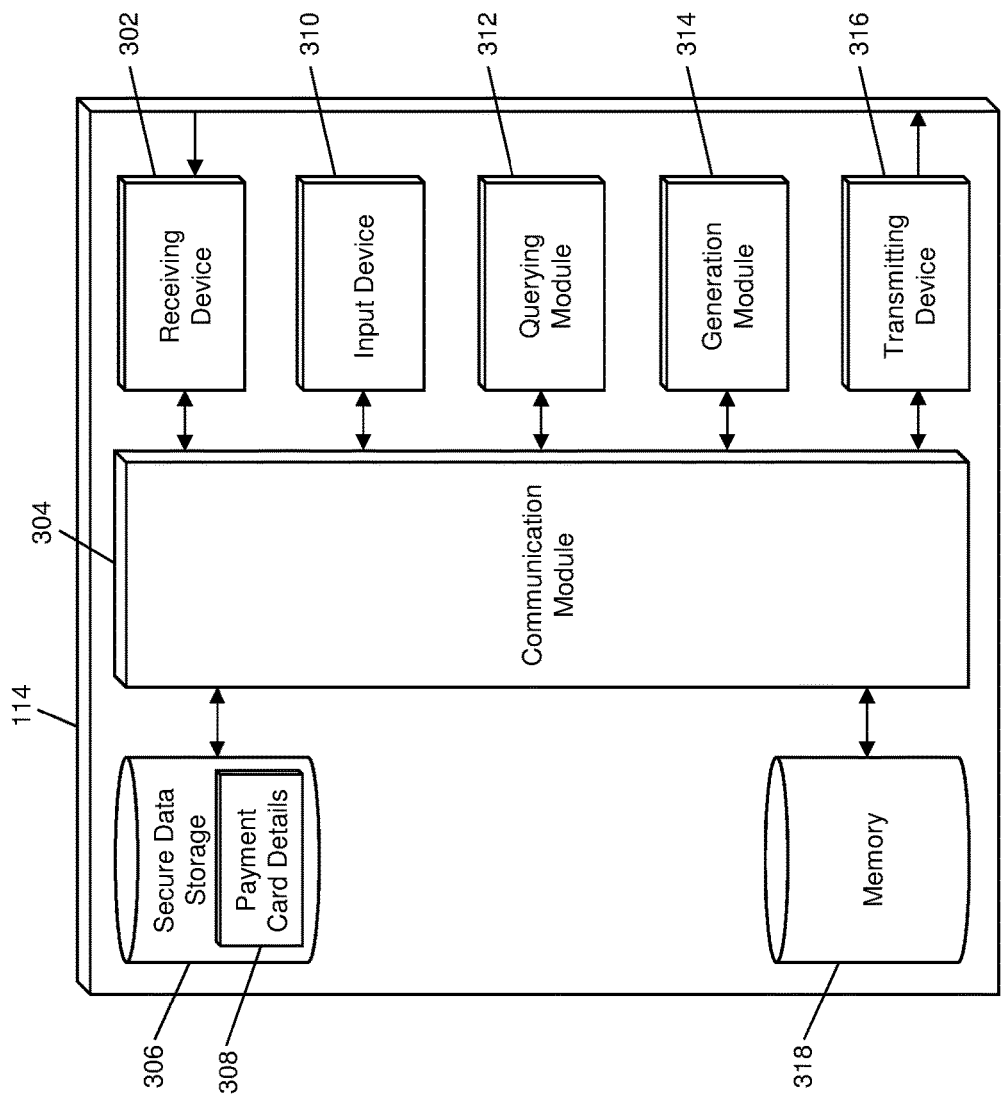
FIG. 3 is a block diagram illustrating the mobile device of FIG. 1B for the transmitting of travel notifications to issuing entities in accordance with exemplary embodiments.

FIG. 3 illustrates an embodiment of the mobile device 114 of the system 100. It will be apparent to persons having skill in the relevant art that the embodiment of the mobile device 114 illustrated in FIG. 3 is provided as illustration only and may not be exhaustive to all possible configurations of the mobile device 114 suitable for performing the functions as discussed herein. For example, the computer system 700 illustrated in FIG. 7 and discussed in more detail below may be a suitable configuration of the mobile device 114.

The mobile device 114 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks for the transmission of transaction messages that include sensitive financial data and information. In some instances, the receiving device 302 may also be configured to receive data from processing servers 102, issuers 106, travel terminals 110, travel data providers 112, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by travel data providers 112 that are superimposed with travel data. Travel data may be received by the receiving device 302 from the travel data provider 112 and may include geographic areas and/or travel dates associated with travel involving a user 104 of the mobile device 114. In some instances, travel data may be received by the receiving device 302 following the submission of a travel data request to the travel data provider 112. The receiving device 302 may also be configured to receive data signals electronically transmitted by processing servers 302 or issuers 106, such as data signals superimposed with requests for payment credentials and/or travel data. The receiving device 302 may also receive data signals electronically transmitted by issuers 106 that include payment credentials for use in payment transactions and in conjunction with the methods and systems discussed herein. Methods suitable for the provisioning of payment credentials to a mobile device 114 will be apparent to persons having skill in the relevant art.

The mobile device 114 may also include a communication module 304. The communication module 304 may be configured to transmit data between modules, engines, databases, memories, and other components of the mobile device 114 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the mobile device 114 and external components of the mobile device 114, such as externally connected databases, display devices, input devices, etc. The mobile device 114 may also include a processing device. The processing device may be configured to perform the functions of the mobile device 114 discussed herein as will be apparent to persons having skill in the relevant art. In some embodiments, the processing device may include and/or be comprised of a plurality of engines and/or modules specially configured to perform one or more functions of the processing device, such as a querying module 312, generation module 314, etc. As used herein, the term "module" may be software or hardware particularly programmed to receive an input, perform one or more processes using the input, and provide an output. The input, output, and processes performed by various modules will be apparent to one skilled in the art based upon the present disclosure.

In some embodiments, the mobile device 114 may include a secure data storage 306. The secure data storage 306 may be configured to store one or more sets of payment card details 308 using a suitable data storage format and schema. The secure data storage 306 may be a secure storage that is configured to securely store data such that it is not accessible via traditional data storage and access methods. For example, the secure data storage 306 may be a Secure Element or other type of secure storage for which access to the data stored therein is limited. For instance, data stored in the secure data storage 306 may be encrypted and may be accessible and/or usable via an encryption key that is not readily available. Each set of payment card details 308 may include at least a transaction account number associated with the transaction account corresponding to the related payment card 108 and may also include any additional data suitable for performing the functions discussed herein and/or use in processing payment transactions, such as transaction counters, transaction account data, key pairs, cryptograms, etc.

The mobile device 114 may also include an input device 310. The input device 310 may be configured to receive input from a user 104 of the mobile device 114. The input device 310 may be any type of input device suitable for performing the functions discussed herein, such as a keyboard, mouse, touch screen, click wheel, scroll wheel, microphone, camera, optical reader, etc. The input device 310 may be configured to receive input from a user 104 requesting initiation of a travel notification transmission to one or more issuers 106. In some instances, the request may be automatically provided via one or more associated inputs, such as an input associated with travel (e.g., travel check-in, itinerary reservation or modification, etc.). In instances where the user 104 is explicitly requesting transmission of a travel notification, the input device 310 may receive input of a selection of one or more sets of payment card details 308 for which notification is requested.

In some embodiments, the processing server 102 may include a querying module 312. The querying module 312 may be configured to execute queries on databases to identify information. The querying module 312 may receive one or more data values or query strings, and may execute a query string based thereon on an indicated database, such as the secure data storage 306, to identify information stored therein. The querying module 312 may then output the identified information to an appropriate engine or module of the mobile device 114 as necessary. The querying module 312 may, for example, execute a query on the secure data storage 306 to identify one or more sets of payment card details 308 as indicated by the user 104 via the input device 310, which may then be conveyed to another engine or module of the mobile device 114, such as a generation module 314. In some embodiments, the querying module 312 may be specially configured for access to the secure data storage 306 such that other engines or modules may be unable to access the secure data storage 306.

The generation module 314 may be configured to generate data messages. The generation module 314 may receive data as input, such as travel data and a set of payment card details 308, and may generate a data message including the input data. In some instances, the generation module 314 may be configured to generate transaction messages, which may be data messages that are specially formatted based on one or more standards, such as the ISO 8583 standard. The generated data or transaction message may include the travel data and payment credentials, and may then be output to another engine or module of the mobile device 114, such as to a transmitting device 316.

The transmitting device 316 may be configured to transmit data over one or more networks via one or more network protocols. In some embodiments, the transmitting device 316 may be configured to transmit data over the payment rails, such as using specially configured infrastructure associated with payment networks for the transmission of transaction messages that include sensitive financial data and information, such as identified payment credentials. In some instances, the transmitting device 316 may be configured to transmit data to issuers 106, travel terminals 110, travel data providers 112, processing servers 102, and other entities via alternative networks, such as the Internet. In some embodiments, the transmitting device 316 may be comprised of multiple devices, such as different transmitting devices for transmitting data over different networks, such as a first transmitting device for transmitting data over the payment rails and a second transmitting device for transmitting data over the Internet. The transmitting device 316 may electronically transmit data signals that have data superimposed that may be parsed by a receiving computing device. In some instances, the transmitting device 316 may include one or more modules for superimposing, encoding, or otherwise formatting data into data signals suitable for transmission.

The transmitting device 316 may be configured to electronically transmit data signals to issuers 106 that are superimposed with data messages generated by the generation module 314 that include associated payment credentials and travel data. In instances where the data message may be a transaction message, the transmitting device 316 may be configured to electronically transmit the transaction message to an issuer 106 using the payment rails. The transmitting device 316 may also be configured to electronically transmit data signals to travel data providers 112 that are superimposed with travel data requests. Travel data requests may include one or more pieces of identifying information, such as received by the receiving device 302 or input via the input device 310. The receiving device 302 may be configured to receive data signals superimposed with travel data in response to the transmitted travel data request, which may be used in the generation of the data messages electronically transmitted by the transmitting device 316. In some embodiments, the transmitting device 316 may also be configured to electronically transmit data signals superimposed with travel data and/or sets of payment card details 308 to a processing server 102, for forwarding to the appropriate issuers 106.

The mobile device 114 may also include a memory 318. The memory 318 may be configured to store data for use by the mobile device 114 in performing the functions discussed herein. The memory 318 may be configured to store data using suitable data formatting methods and schema and may be any suitable type of memory, such as read-only memory, random access memory, etc. The memory 318 may include, for example, encryption keys and algorithms, communication protocols and standards, data formatting standards and protocols, program code for modules and application programs of the processing device, and other data that may be suitable for use by the mobile device 114 in the performance of the functions disclosed herein as will be apparent to persons having skill in the relevant art.

Figure 4:
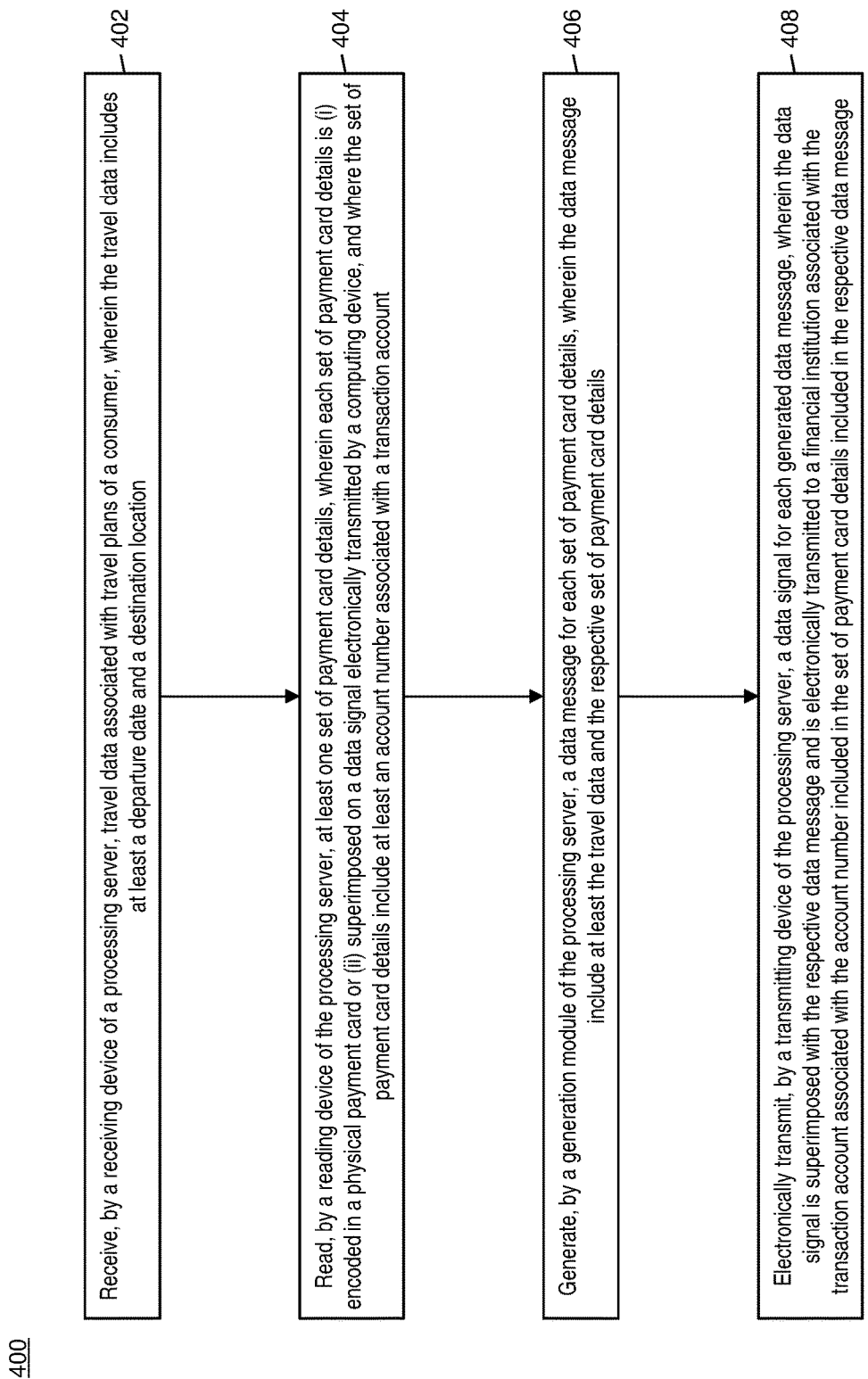
FIGS. 4 and 5 are flow charts illustrating exemplary methods for transmitting travel notifications to issuing entities in accordance with exemplary embodiments.

First Exemplary Method for Transmitting Travel Notifications to Issuing Entities FIG. 4 illustrates a method 400 for the transmitting of travel notifications to issuing entities via a travel terminal 110 and/or processing server 102.

In step 402, travel data associated with travel plans of a consumer (e.g., the user 104) may be received by a receiving device (e.g., the receiving device 202) of a processing server (e.g., the processing server 102), wherein the travel data includes at least a departure date and a destination location. In step 404, at least one set of payment card details may be read by a reading device (e.g., the reading device 210) of the processing server, wherein each set of payment card details is (i) encoded in a physical payment card (e.g., payment card 108) or (ii) superimposed on a data signal electronically transmitted by a computing device (e.g., the mobile device 114), and where the set of payment card details include at least an account number associated with a transaction account.

In step 406, a data message may be generated by a generation module (e.g., the generation module 214) of the processing server for each set of payment card details, wherein the data message includes at least the travel data and the respective set of payment card details. In step 408, a data signal may be electronically transmitted for each generated data message by a transmitting device (e.g., the transmitting device 216) of the processing server, wherein the data signal is superimposed with the respective data message and is electronically transmitted to a financial institution (e.g., issuer 106) associated with the transaction account associated with the account number included in the set of payment card details included in the respective data message.

In one embodiment, each data message may be a transaction message formatted based on one or more standards governing the transmission of financial transaction messages and may include a plurality of data elements including at least a data element configured to store the account number included in the associated set of payment card details. In a further embodiment, each data signal may be electronically transmitted via a payment network. In some embodiments, the method 400 may also include electronically transmitting, by the transmitting device of the processing server, a data signal superimposed with an itinerary request, wherein the itinerary request includes at least an account number included in one of the at least one set of payment card details, wherein receiving the travel data includes receiving a data signal electronically transmitted in response to the transmitted data signal superimposed with the itinerary request, and wherein the travel data is superimposed on the received data signal.

In one embodiment, the method 400 may further include: storing, in a travel database (e.g., the travel database 206) of the processing server, a plurality of travel data entries (e.g., travel data entries 208), wherein each travel data entry is a structured data set related to a travel plan of a consumer and includes at least a travel identifier, departure date, and destination location; and receiving, by an input device of the processing server, a specific travel identifier; wherein receiving the travel data comprises receiving, from a querying module of the processing server, a specific travel data entry identified via querying of the travel database to identify a travel data entry where the included travel identifier corresponds to the specific travel identifier.

Figure 5:
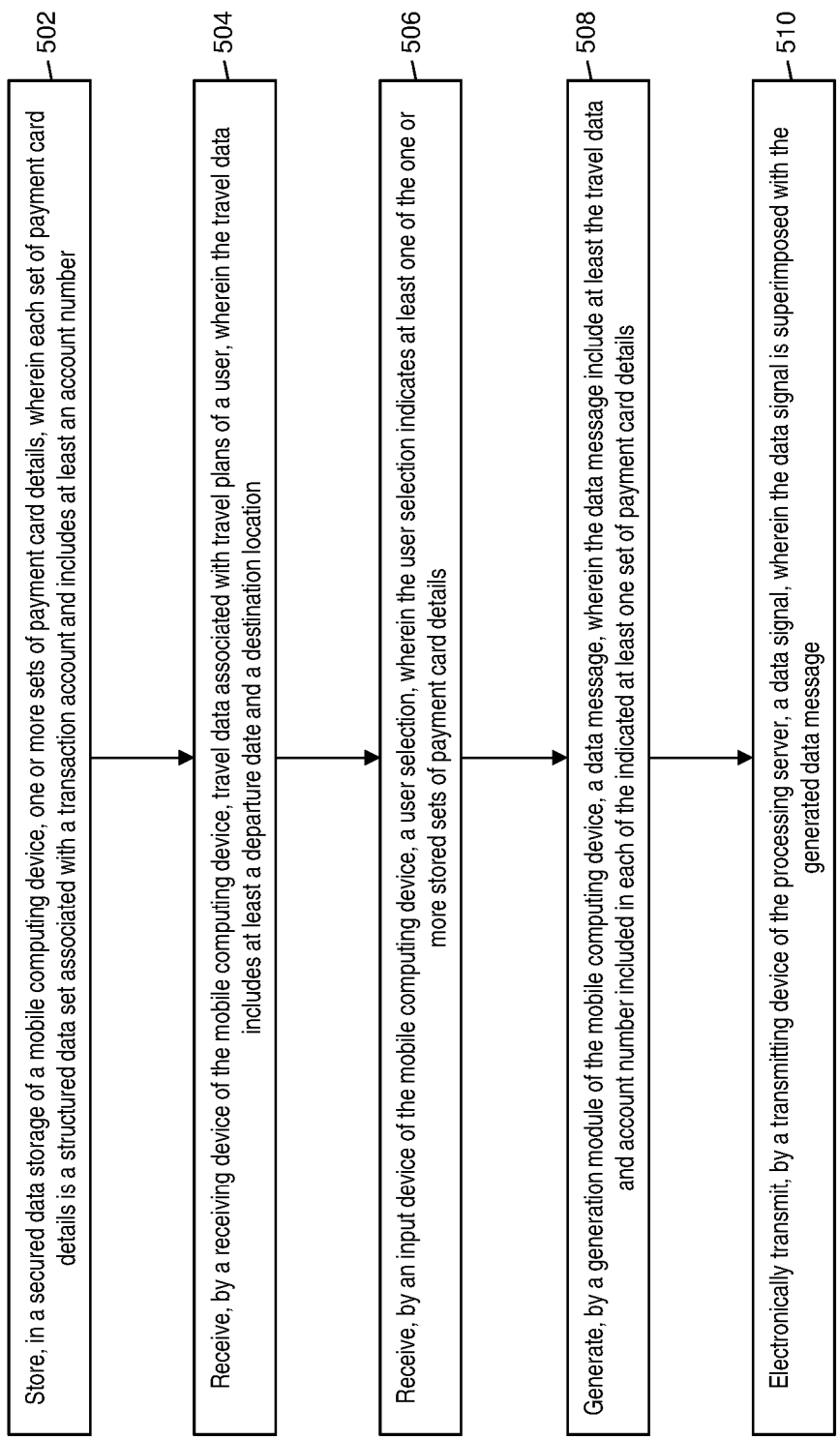

Second Exemplary Method for Transmitting Travel Notifications to Issuing Entities FIG. 5 illustrates a method 500 for the transmission of travel notifications to issuing entities via a mobile device 114.

In step 502, one or more sets of payment card details (e.g., payment card details 308) may be stored in a secure data storage (e.g., secure data storage 306) of a mobile computing device (e.g., mobile device 114), wherein each set of payment card details is a structured data set associated with a transaction account and includes at least an account number. In step 504, travel data associated with travel plans of a user (e.g., the user 104) may be received by a receiving device (e.g., the receiving device 302) of the mobile computing device, wherein the travel data includes at least a departure date and a destination location.

In step 506, a user selection may be received by an input device (e.g., the input device 310) of the mobile computing device, wherein the user selection indicates at least one of the one or more stored sets of payment card details. In step 508, a data message may be generated by a generation module (e.g., the generation module 314) of the mobile computing device, wherein the data message includes at least the travel data and account number included in each of the indicated at least one set of payment card details. In step 510, a data signal may be electronically transmitted by a transmitting device (e.g., the transmitting device 316) of the mobile computing device, wherein the data signal is superimposed with the generated data message.

In one embodiment, the data signal may be electronically transmitted to an issuing financial institution (e.g., the issuer 106) associated with the transaction account related to each of the indicated at least one set of payment card details. In some embodiments, the method 500 may also include: receiving, by the input device of the mobile computing device, a travel identifier associated with travel plans of the user; and electronically transmitting, by the transmitting device of the processing server, a data signal superimposed with the travel identifier, wherein receiving the travel data includes receiving a data signal in response to the transmitted data signal superimposed with the travel identifier, wherein the received data signal is superimposed with the travel data.

In one embodiment, the method 500 may further include electronically transmitting, by the transmitting device of the processing server, a data signal superimposed with the account number included in at least one of the indicated at least one set of payment card details, wherein receiving the travel data includes receiving a data signal in response to the transmitted data signal superimposed with the account number, wherein the received data signal is superimposed with the travel data. In some embodiments, the receiving device and the input device may be a single device, and the travel data may be received via input by the user of the mobile computing device.

Payment Transaction Processing System and Process

Figure 6:
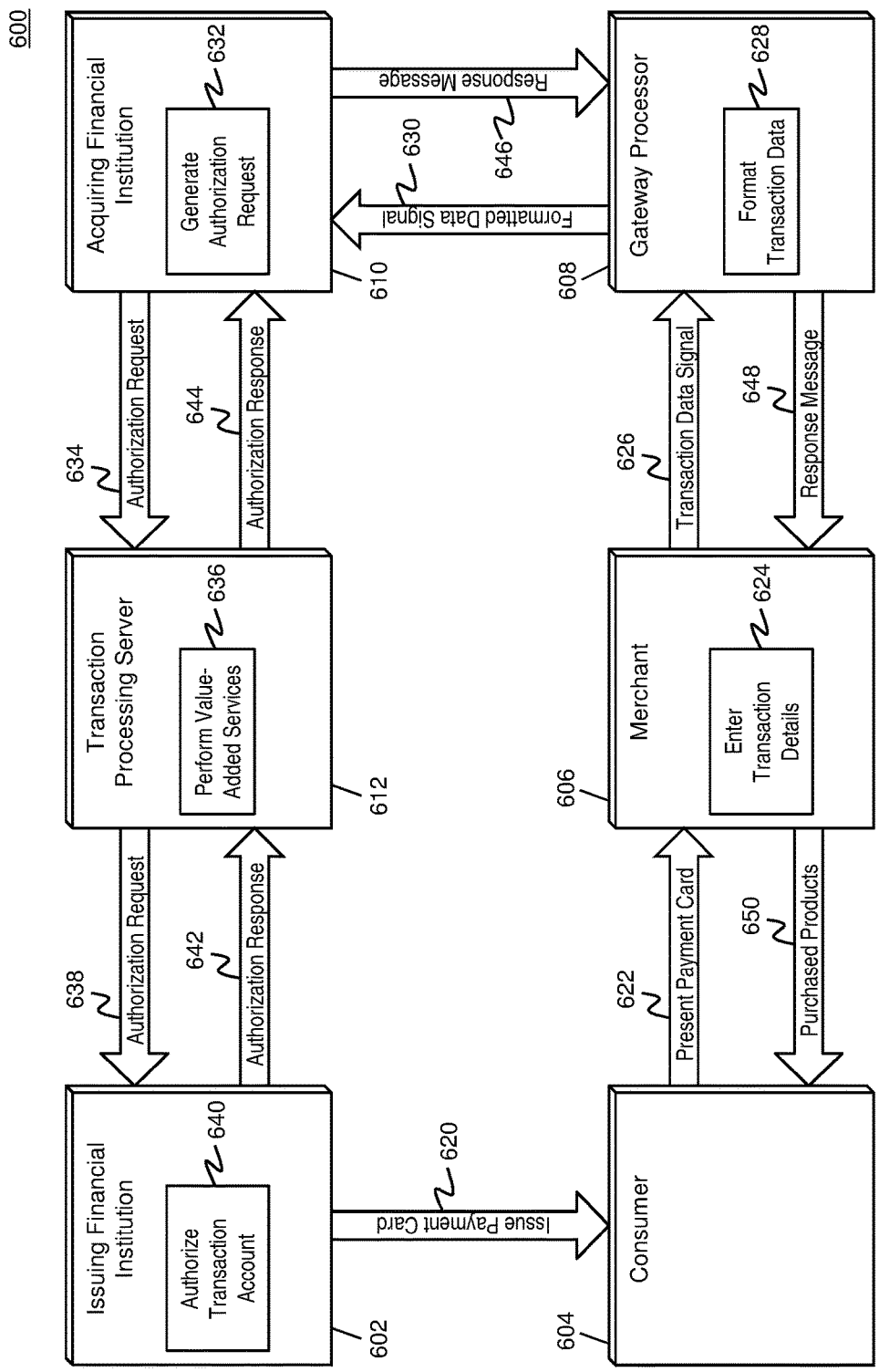
FIG. 6 is a flow diagram illustrating the processing of a payment transaction in accordance with exemplary embodiments.

FIG. 6 illustrates a transaction processing system and a process 600 for the processing of payment transactions in the system. The process 600 and steps included therein may be performed by one or more components of the system 100 discussed above, such as the processing server 102, mobile device 114, issuer 106, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 4 and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment card details for the payment card, or initiating transmission of payment card details to the merchant 606 via a third party. The merchant 606 may receive the payment card details (e.g., via the electronic transmission, via reading them from a physical payment card, etc.), which may include at least a transaction account number associated with the payment card and/or associated transaction account. In some instances, the payment card details may include one or more application cryptograms, which may be used in the processing of the payment transaction.

In step 624, the merchant 606 may enter transaction details into a point of sale computing system. The transaction details may include the payment card details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, assuming the transaction as approved, the merchant 606 may then provide the products purchased by the consumer 604 as part of the payment transaction to the consumer 604.

In some embodiments, once the process 600 has been completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
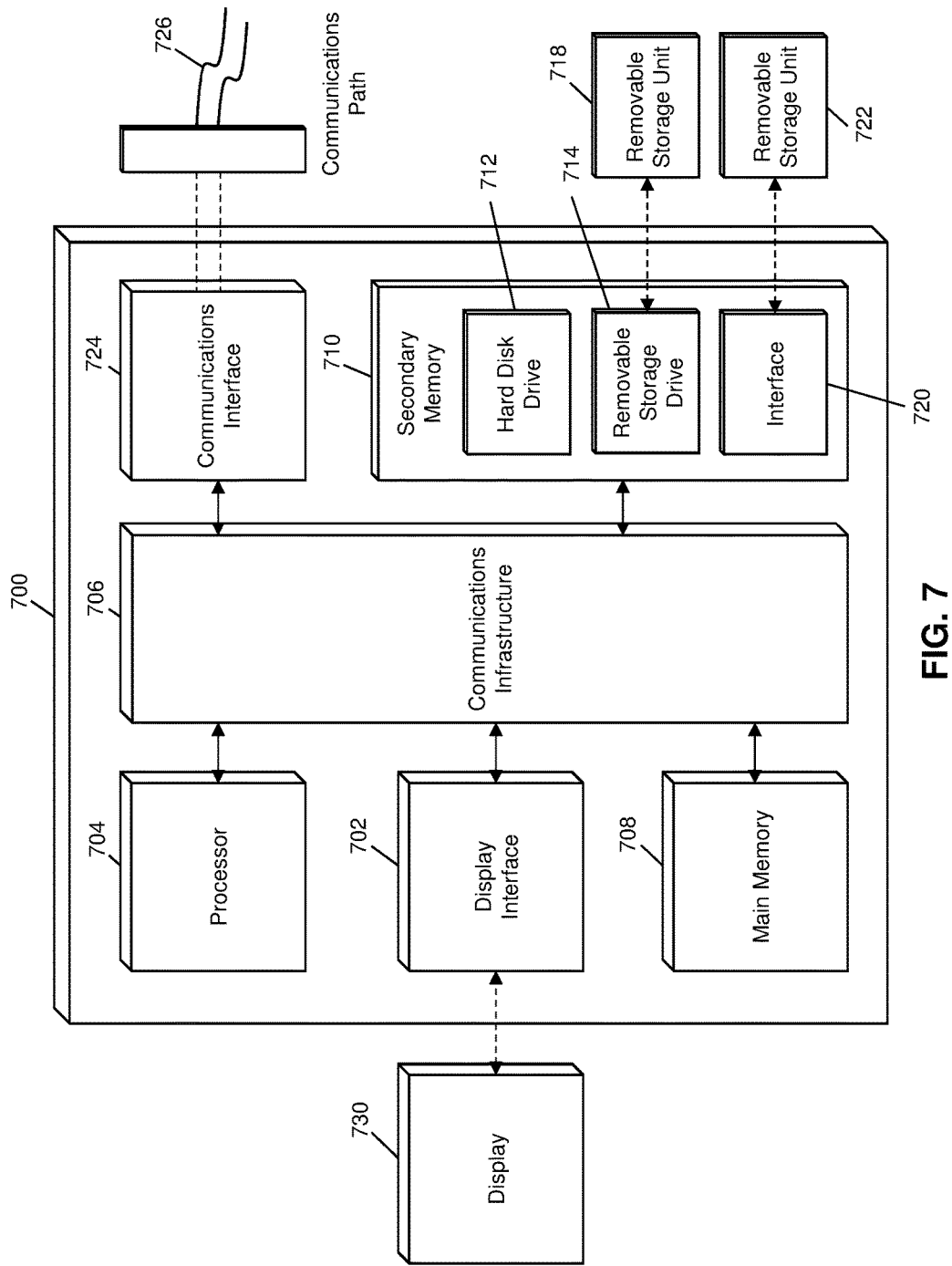
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 and mobile device 114 of FIGS. 1A and 1B may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for transmitting travel notifications to issuing entities. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transmitting travel notifications to issuing entities, comprising:
   receiving, by a receiving device of a processing server, from a first source device, travel data associated with travel plans of a consumer, wherein the processing server is remotely located within a system and configured to communicate between a financial institution and a travel provider, and wherein the travel data includes at least a departure date and a destination location;
   receiving, by the processing server, at least one set of payment card details, from a second source device including at least one of a payment card and a mobile computing device, wherein the receiving includes at least one of (i) decoding each set of payment card details from encoded data in the payment card and (ii) parsing a data signal received from the mobile computing device and obtaining data superimposed on the data signal, and wherein the set of payment card details includes at least an account number associated with a transaction account;
   generating, by a generation module of the processing server, a data message for each set of payment card details received from the second source device, wherein the data message includes at least the travel data received from the first source device and the respective set of payment card details received from the second source device;
   formatting, by the processing server, each data message to a particular standard required by a payment network for transmission thereto; and
   electronically transmitting, by a transmitting device of the processing server, each formatted data message to a financial institution associated with the transaction account associated with the account number included in the set of payment card details included in the respective data message,
   wherein the formatted data message signal is transmitted to the financial institution via the payment network using specialized infrastructure associated with the payment network.

2. The method of claim 1, wherein each data message is a transaction message formatted based on one or more standards governing the transmission of financial transaction messages and includes a plurality of data elements including at least a data element storing the account number included in the associated set of payment card details.

3. The method of claim 1, further comprising:
   electronically transmitting, by the transmitting device of the processing server, a data signal superimposed with an itinerary request, wherein the itinerary request includes at least an account number included in one of the at least one set of payment card details, wherein
   receiving the travel data includes receiving a data signal electronically transmitted in response to the transmitted data signal superimposed with the itinerary request, wherein the travel data is superimposed on the received data signal.

4. The method of claim 1, further comprising:
   storing, in a travel database of the processing server, a plurality of travel data entries, wherein each travel data entry is a structured data set related to a travel plan of a consumer and includes at least a travel identifier, departure date, and destination location; and
   receiving, by an input device of the processing server, a specific travel identifier; wherein
   receiving the travel data comprises receiving, from a querying module of the processing server, a specific travel data entry identified via querying of the travel database to identify a travel data entry where the included travel identifier corresponds to the specific travel identifier.

5. A method for transmitting travel notifications to issuing institutions, comprising:
   storing, in a secured data storage of a mobile computing device of a card user, one or more sets of payment card details, wherein each set of payment card details is a structured data set associated with a transaction account of the card user and includes at least an account number;
   receiving, by a receiving device of the mobile computing device of the card user, from a travel data provider, travel data associated with travel plans of the card user, wherein the travel data includes at least a departure date and a destination location;
   receiving, by an input device of the mobile computing device of the card user, a user selection, wherein the user selection indicates at least one of the one or more stored sets of payment card details;
   generating, by a generation module of the mobile computing device of the card user, a data message, wherein the data message includes at least the travel data and account number included in each of the indicated at least one set of payment card details;
   formatting, by the processing server, the data message to a particular standard required for transmission to a financial institution; and
   electronically transmitting, by a transmitting device of the mobile computing device of the card user, the formatted data message, to the issuing financial institution associated with the transaction account related to each of the indicated at least one set of payment card details.

6. The method of claim 5, further comprising:
   receiving, by the input device of the mobile computing device, a travel identifier associated with travel plans of the user; and
   electronically transmitting, by the transmitting device of the processing server, a data signal superimposed with the travel identifier, wherein
   receiving the travel data includes receiving a data signal in response to the transmitted data signal superimposed with the travel identifier, wherein the received data signal is superimposed with the travel data.

7. The method of claim 5, further comprising:
   electronically transmitting, by the transmitting device of the processing server, a data signal superimposed with the account number included in at least one of the indicated at least one set of payment card details, wherein
   receiving the travel data includes receiving a data signal in response to the transmitted data signal superimposed with the account number, wherein the received data signal is superimposed with the travel data.

8. The method of claim 5, wherein
   the receiving device and the input device are a single device.

9. A system for transmitting travel notifications to issuing entities, comprising:
   a receiving device of a processing server configured to receive, from a first source device, travel data associated with travel plans of a consumer, wherein the processing server is remotely located within a system and configured to communicate between a financial institution and a travel provider, and wherein the travel data includes at least a departure date and a destination location, receive at least one set of payment card details from a second source device including at least one of a payment card and a mobile computing device, wherein when receiving said at least one set of payment card details, said receiving device (i) decodes the at least one set of payment card details from data encoded in the payment card or (ii) parses a data signal received from the mobile computing device to obtain data superimposed on the data signal, and wherein the set of payment card details includes at least an account number associated with a transaction account;

a generation module of the processing server configured to generate a data message for each set of payment card details received from the second source device, wherein the data message includes at least the travel data received from the first source device and the respective set of payment card details received from the second course device;

a processing device, of the processing server, configured to format each data message to a particular standard required by a payment network for transmission thereto; and a transmitting device of the processing server configured to electronically transmit each formatted data message to a financial institution associated with the transaction account associated with the account number included in the set of payment card details included in the respective data message, wherein each formatted data message is transmitted to the financial institution via a payment network using specialized infrastructure associated with the payment network.

10. The system of claim 9, wherein each data message is a transaction message formatted based on one or more standards governing the transmission of financial transaction messages and includes a plurality of data elements including at least a data element configured to store the account number included in the associated set of payment card details.

11. The system of claim 9, wherein the transmitting device of the processing server is further configured to electronically transmit a data signal superimposed with an itinerary request, wherein the itinerary request includes at least an account number included in one of the at least one set of payment card details, and receiving the travel data includes receiving a data signal electronically transmitted in response to the transmitted data signal superimposed with the itinerary request, wherein the travel data is superimposed on the received data signal.

12. The system of claim 9, further comprising:

a travel database of the processing server configured to store a plurality of travel data entries, wherein each travel data entry is a structured data set related to a travel plan of a consumer and includes at least a travel identifier, departure date, and destination location; and an input device of the processing server configured to receive a specific travel identifier; wherein receiving the travel data comprises receiving, from a querying module of the processing server, a specific travel data entry identified via querying of the travel database to identify a travel data entry where the included travel identifier corresponds to the specific travel identifier.

13. A system for transmitting travel notifications to issuing institutions, comprising:

a secured data storage, of a mobile computing device of a card user, configured to store one or more sets of payment card details, wherein each set of payment card details is a structured data set associated with a transaction account of the card user and includes at least an account number;

a receiving device, of the mobile computing device of the card user, configured to receive, from a travel data provider, travel data associated with travel plans of the card user, wherein the travel data includes at least a departure date and a destination location;

an input device, of the mobile computing device of the card user, configured to receive a user selection, wherein the user selection indicates at least one of the one or more stored sets of payment card details;

a generation module, of the mobile computing device of the card user, configured to generate a data message, wherein the data message includes at least the travel data and account number included in each of the indicated at least one set of payment card details;

a processing device, of the mobile computing device, configured to format the data message to a particular standard required for transmission to an issuing financial institution; and a transmitting device, of the mobile computing device of the card user, configured to electronically transmit the formatted data message to the issuing financial institution associated with the transaction account related to each of the indicated at least one set of payment card details.

14. The system of claim 13, wherein the input device of the mobile computing device is further configured to receive a travel identifier associated with travel plans of the user, the transmitting device of the processing server is further configured to electronically transmit a data signal superimposed with the travel identifier, and receiving the travel data includes receiving a data signal in response to the transmitted data signal superimposed with the travel identifier, wherein the received data signal is superimposed with the travel data.

15. The system of claim 13, wherein the transmitting device of the processing server is further configured to electronically transmit a data signal superimposed with the account number included in at least one of the indicated at least one set of payment card details, and receiving the travel data includes receiving a data signal in response to the transmitted data signal superimposed with the account number, wherein the received data signal is superimposed with the travel data.

16. The system of claim 13, wherein the receiving device and the input device are a single device, and the travel data is received via input by the user of the mobile computing device.

* * * * *